(12) United States Patent
Pan et al.

(10) Patent No.: US 8,861,112 B1
(45) Date of Patent: Oct. 14, 2014

(54) TWO DIMENSIONAL MAGNETIC RECORDING SYSTEM HEAD SEPARATION ESTIMATOR

(71) Applicant: LSI Corporation, San Jose, CA (US)

(72) Inventors: Lu Pan, San Jose, CA (US); Rui Cao, San Jose, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/261,395

(22) Filed: Apr. 24, 2014

Related U.S. Application Data

(60) Provisional application No. 61/983,425, filed on Apr. 23, 2014.

(51) Int. Cl.
*G11B 5/09* (2006.01)
(52) U.S. Cl.
USPC ............... 360/39; 360/46; 360/53; 360/55; 369/59.1

(58) Field of Classification Search
None
See application file for complete search history.

(56) References Cited

U.S. PATENT DOCUMENTS

| 7,515,369 | B2 * | 4/2009 | Sugawara et al. | 360/51 |
| 8,174,949 | B2 * | 5/2012 | Ratnakar Aravind | 369/59.19 |
| 2012/0275279 | A1 * | 11/2012 | Wilson et al. | 369/13.24 |

* cited by examiner

*Primary Examiner* — Muhammad N Edun
(74) *Attorney, Agent, or Firm* — Hamilton DeSanctis & Cha

(57) ABSTRACT

An apparatus for estimating head separation in an array reader magnetic recording system includes an array reader with multiple read heads operable to read data from a magnetic storage medium, a first preamplifier connected to a first read head, a second preamplifier connected to a second read head, and a head separation estimation circuit connected to the first preamplifier and to the second preamplifier, operable to estimate an integer phase offset and a fractional phase offset between a first signal from the first read head and a second signal from the second read head.

20 Claims, 3 Drawing Sheets

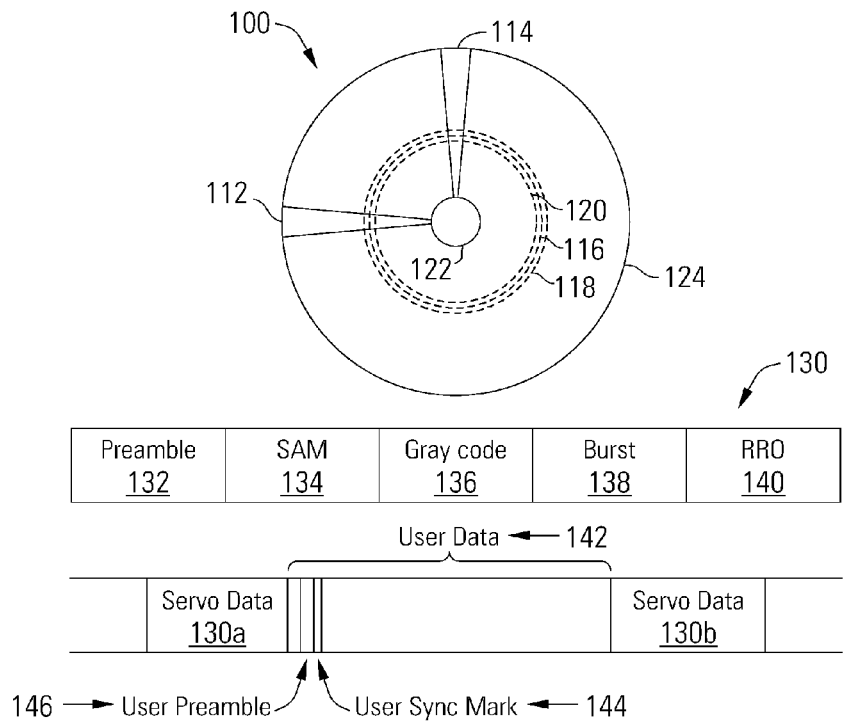
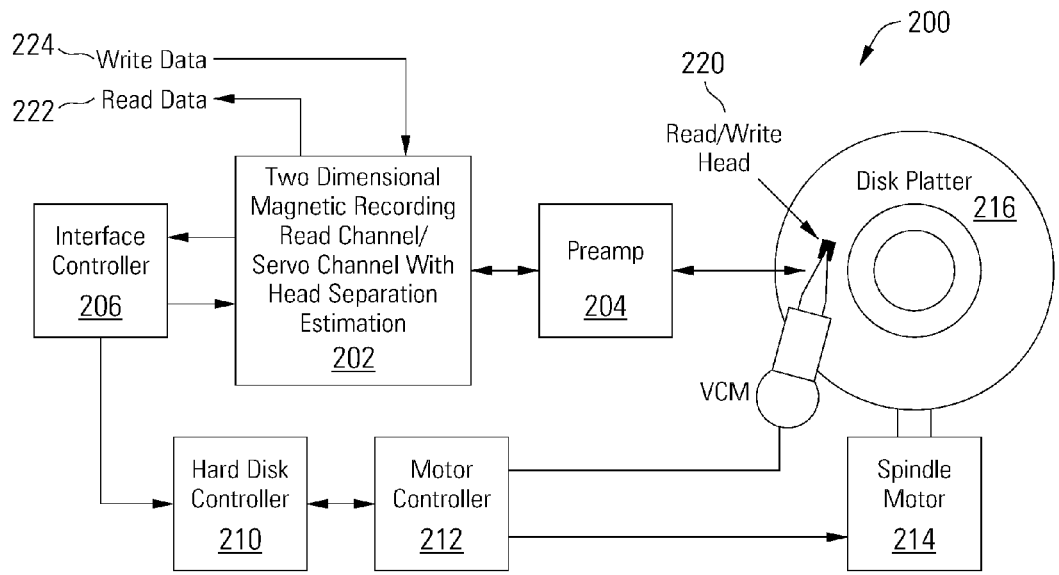

TWO DIMENSIONAL MAGNETIC RECORDING SYSTEM HEAD SEPARATION ESTIMATOR

CROSS REFERENCE TO RELATED APPLICATIONS

The present application claims priority to (is a non-provisional of) U.S. Pat. App. No. 61/983,425, entitled "Two Dimensional Magnetic Recording System Head Separation Estimator", and filed Apr. 23, 2014 by Pan et al, the entirety of which is incorporated herein by reference for all purposes.

FIELD OF THE INVENTION

Various embodiments of the present invention provide systems and methods for determining head separation in a two dimensional magnetic recording system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. In a two dimensional magnetic recording system, the read/write head assembly includes an array of multiple read heads each positioned to read the target track. The separation of the read heads can vary, altering the phase offset between signals from the different read heads, particularly as the array of read heads is moved over the magnetic storage medium.

SUMMARY

Various embodiments of the present invention provide systems and methods for determining head separation in a two dimensional magnetic recording system.

In some embodiments, an apparatus for estimating head separation in an array reader magnetic recording system includes an array reader with multiple read heads operable to read data from a magnetic storage medium, a first preamplifier connected to a first read head, a second preamplifier connected to a second read head, and a head separation estimation circuit connected to the first preamplifier and to the second preamplifier, operable to estimate an integer phase offset and a fractional phase offset between a first signal from the first read head and a second signal from the second read head.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention.

Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

FIG. 1 is a diagram of a magnetic storage medium and sector data scheme that may be used with a two dimensional magnetic recording servo channel with adaptive combination in accordance with some embodiments of the present invention;

FIG. 2 depicts a storage system including a two dimensional magnetic recording read channel/servo channel with head separation estimator in accordance with some embodiments of the present invention;

DETAILED DESCRIPTION OF THE INVENTION

Figure 3:
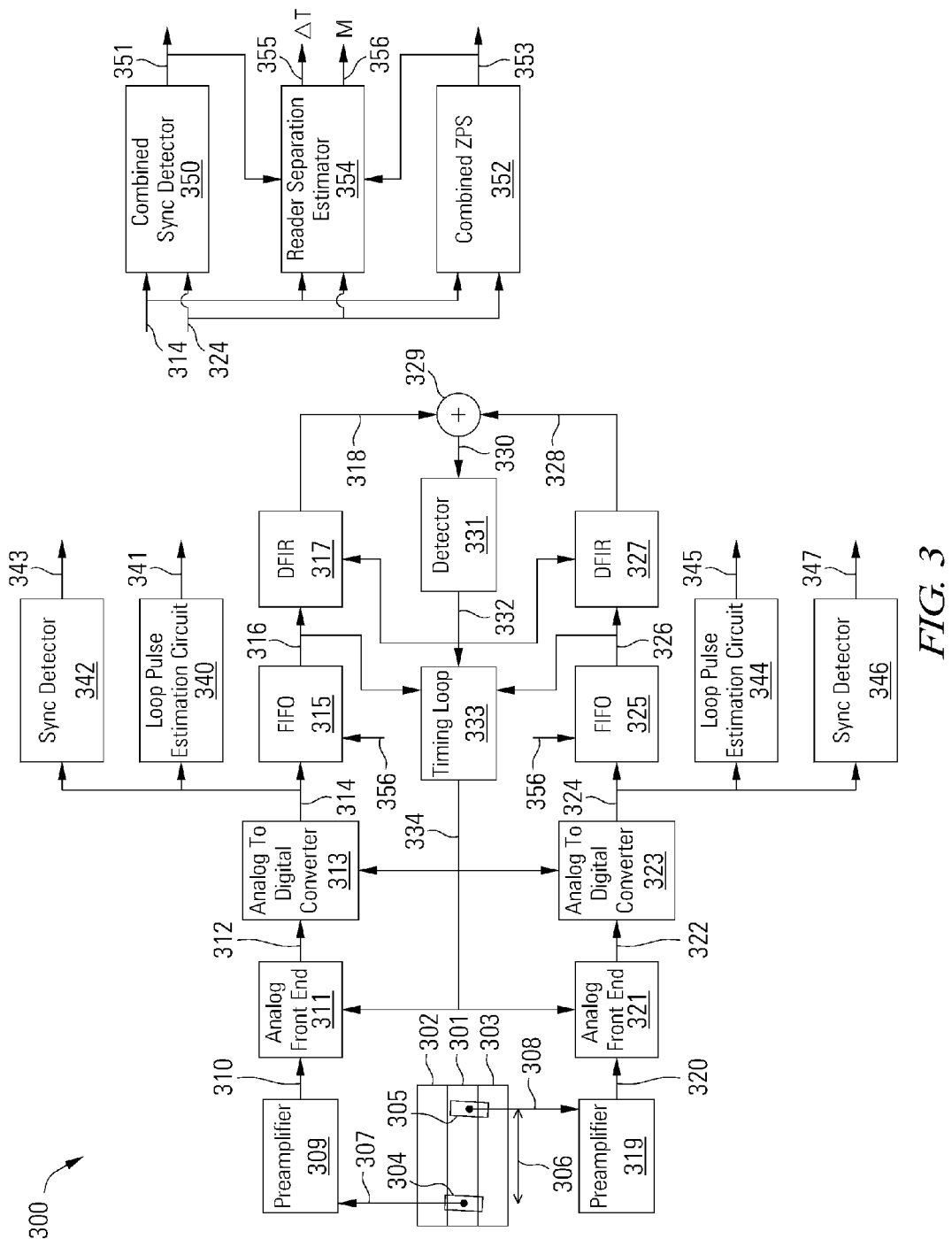
FIG. 3 is a block diagram of a two dimensional magnetic recording read channel/servo channel with head separation estimator in accordance with some embodiments of the present invention.

A head separation estimator is disclosed herein for a two dimensional magnetic recording system, also referred to as an array reader magnetic recording system. The signals from each of the multiple read heads in the array reader are phase aligned and combined, including compensating for integer phase offsets which are phase offsets that are integer multiples of the bit period, as well as compensating for fractional phase offsets which are phase offsets that are less than a single bit period. By compensating for both integer and fractional phase offsets between the signals in a two dimensional magnetic recording system, the phase aligned signals can be combined for reliable data detection. Rather than using detected syncmark location to estimate the integer phase offset, which relies on loop pulse estimation calibration, but wherein the loop pulse estimation calibration relies on correct phase alignment of the signals, the present head separation estimator breaks this cycle to provide for reliable and non-circular estimation of phase offset. This head separation estimation can be summarized according to some embodiments as follows:

Step 1: Perform phase start detection on first and second streams, and calculate fractional phase offset $\Delta T$ as difference between phase start location of first and second streams Step 2: Calibrate loop pulse estimation LPE1 and LPE2 for the signal from each read head using known data as follows:
  a) Train first loop pulse estimation LPE1 using digital samples for the signal from the primary read head, applying any desired loop pulse estimation constraints
  b) Set the timing loop error combining ratio to [1 0] to consider only the signal from the primary read head in the timing loop
  c) Interpolate the second loop pulse estimation LPE2 from the first loop pulse estimation LPE1 based on the fractional phase offset $\Delta T$ Step 3: Calibrate integer phase offset M as follows:
a) Set timing loop error combining ratio to [1/2 1/2] to consider signals from the primary read head and secondary read head in the timing loop
b) Detect the syncmark in the two streams with the stream processing controlled based on both loop pulse estimations LPE1 and LPE2
c) Compute the integer phase offset M as the difference between the locations of the syncmarks in both streams Although the head separation estimation is disclosed herein with respect to example embodiments with two read heads in the array reader, the head separation estimation can be applied to array readers with any number of read heads, by repeating the process disclosed herein to estimate the phase offset between each of the other secondary read heads with respect to the read head selected as the primary read head for the head separation estimation.

Turning to FIG. 1, a diagram of a magnetic storage medium and sector data scheme is shown that can be used with a two dimensional magnetic recording system with head separation estimation in accordance with some embodiments of the present invention. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. As the servo data (e.g., 130) is processed by the servo channel, signals from multiple read heads in the two dimensional magnetic recording system are produced representing the servo data (e.g., 130). The phase offset of the signals due to head separation is estimated, including integer phase offset and fractional phase offset, and the signals are combined, yielding a combined signal. Values in the combined signal can then be detected and corrected in any suitable manner, such as using a Soft Output Viterbi Algorithm (SOVA) detector.

Turning to FIG. 2, a storage system 200 is disclosed which includes a read channel/servo channel circuit 202 with head separation estimation in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by an array of read heads in read/write head assembly 220 as disk platter 216 is rotated by spindle motor 214. The sensed magnetic signals are provided as continuous, minute analog signals representative of the magnetic data on disk platter 216. These minute analog signals are transferred from read/write head assembly 220 to read channel circuit 202 via preamplifiers 204. Preamplifiers 204 are operable to amplify the minute analog signals accessed from disk platter 216. In turn, servo channel circuit 202 processes servo data to correctly position the read/write head assembly 220 over the disk platter 216, and the read channel circuit digitizes and decodes the received analog signals to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading data from the array of read heads in read/write head assembly 220, read channel/servo channel circuit 202 estimates the phase offset of the signals from each read head caused by the separation of the read heads in read/write head assembly 220, and aligns the signals before combining them. Such head separation estimation can be implemented consistent with that disclosed below in relation to FIG. 3. In some cases, the head separation estimation can be performed consistent with the flow diagram disclosed below in relation to FIG. 4.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Turning to FIG. 3, a two dimensional magnetic recording system 300 with head separation estimation is depicted in accordance with some embodiments of the present invention. An array reader or sensor includes multiple read heads such as, but not limited to, the two read heads 304, 305 shown in FIG. 3. The read heads 304, 305 are positioned over a target track 301 between side tracks 302, 303. In some embodiments, there is a down track separation 306 between the read heads 304, 305, causing a phase offset between the signals 307, 308 from the read heads 304, 305. The phase offset includes an integer phase offset M, an integer multiple of the bit period, and a fractional phase offset ΔT which is less than a single bit period. Separate read channel processing paths are provided for each of the signals 307, 308 from the read heads 304, 305.

Preamplifiers 309, 319 amplify the analog signals 307, 308 from read heads 304, 305, yielding amplified analog signals 310, 320. Analog signals 307, 308 may be, but are not limited to, minute analog electrical signals derived from read heads 304, 305 in a read/write head assembly that is disposed in relation to a storage medium (not shown). Based upon the disclosure provided herein, one of ordinary skill in the art will recognize a variety of sources from which analog signals 307, 308 may be derived. Analog front end circuits 311, 321 receive and process the amplified analog signals 310, 320, providing processed analog signals 312, 322 to analog to digital converter circuits 313, 323. Analog front end circuits 311, 321 may include, but are not limited to, an analog filter and an amplifier circuit as are known in the art. Based upon the disclosure provided herein, one of ordinary skill in the art will recognize a variety of circuitry that may be included as part of analog front end circuits 311, 321.

Analog to digital converter circuits 313, 323 convert processed analog signals 312, 322 into corresponding series of digital samples 314, 324. Analog to digital converter circuits 313, 323 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention.

The analog front end 311, 321 and analog to digital converter circuits 313, 323 can be controlled by a feedback signal 334 from a timing loop 333, for example to adjust the filtering and sampling phase to reduce or eliminate the fractional phase offset ΔT between the signal paths. The timing loop 333 can include any suitable circuits for adjusting the feedback signal 334 to reduce or eliminate the fractional phase offset ΔT, such as, but not limited to, a frequency synthesizer and comparator to adjust the sampling clock to reduce an error signal. Notably, the timing loop 333 can scale the digital samples 316, 326 before using them to adjust the feedback signal 334, so that changes in the adjusting the feedback signal 334 can reduce phase errors in both digital samples 316, 326 equally, or can focus on adjusting the feedback signal 334 to reduce phase errors in either digital samples 316 or 326. The digital samples 316, 326 can be scaled in any suitable manner, such as using multipliers in timing loop 333. For example, by applying a timing loop error combining ratio of [1 0], the timing loop 333 generates feedback signal 334 based on the digital samples 316 and not on digital samples 326. By applying a timing loop error combining ratio of [1/2 1/2], the timing loop 333 generates feedback signal 334 based on the digital samples 316 and 326 equally.

The series of digital samples 314, 324 are provided to delay circuits such as, but not limited to, first-in first-out (FIFO) memories 315, 325, which remove the integer phase offset M based on a phase offset M control signal 356. For example, the earlier of the series of digital samples 314, 324 is delayed in its associated FIFO memory 315, 325 by M bit periods, so that any phase offset between the digital samples 316, 326 at the outputs of the FIFO memories 315, 325 is less than bit period. Any remaining phase offset or fractional phase offset ΔT can be corrected by the timing loop 333.

The digital samples 316, 326 are provided to equalizer circuits 317, 327. Equalizer circuits 317, 327 apply an equalization algorithm to digital samples 316, 326 to yield equalized outputs 318, 328. In some embodiments of the present invention, equalizer circuits 317, 327 are digital finite impulse response filter circuits as are known in the art. Based upon the disclosure provided herein, one of ordinary skill in the art will recognize a variety of equalizer circuits that may be used in relation to different embodiments of the present invention.

The digital samples 316, 326 and/or equalized outputs 318, 328 can receive any other desired processing, such as, but not limited to, noise scaling, prior to being combined in adder circuit 329 to generate combined signal 330.

The combined signal 330 is provided to a data detector circuit 331 which applies a data detection algorithm to combined signal 330 to yield detected output 332. In some embodiments, the data detection algorithm may be but is not limited to, a Soft Output Viterbi Algorithm (SOVA), or a Maximum a Posteriori detection algorithm as are known in the art. Based upon the disclosure provided herein, one of ordinary skill in the art will recognize a variety of data detection algorithms that may be used in relation to different embodiments of the present invention.

The detected output 332 can be used or further processed in any desired manner, for example by decoding, de-interleaving and producing hard decisions representing the originally stored data. The detected output 332 can also be used, for example, to adapt filter tap coefficients for equalizer circuits 317, 327 and to generate an error signal for the timing loop 333.

The digital samples 314 are also provided to a loop pulse estimation circuit 340 which calculates a loop pulse estimation 341 for the first signal path for the first or primary read head 304. The loop pulse estimation circuit 340 can calculate the loop pulse estimation 341 in any suitable manner, for example by applying a least mean squares algorithm to the digital samples 314 and detected output 332 to obtain the loop pulse estimation of the first data path. The loop pulse estimation is a partial response target representing the bit response of the first data path. The loop pulse estimation circuit 340 can also apply any desired constraints, such as, but not limited to, a shoulder constraint, or peek-shoulder constraint. Similarly, the digital samples 324 can also be provided to a loop pulse estimation circuit 344 which can calculate a loop pulse estimation 345 for the second signal path for the secondary read head 305 in the same manner in some embodiments. However, according to the head separation estimation disclosed herein, the loop pulse estimation 345 for the second signal path can be calculated by interpolating the loop pulse estimation 341 based on the fractional phase offset $\Delta T$.

The digital samples 314 are also provided to a sync detector circuit 342 that searches for sync marks or servo address mark bits in digital samples 314, yielding the position or location 343 of the sync mark in the stream of bits in digital samples 314. Similarly, digital samples 324 are also provided to a sync detector circuit 346 that searches for sync marks or servo address mark bits in digital samples 324, yielding the position or location 347 of the sync mark in the stream of bits in digital samples 324. Based upon the disclosure provided herein, one of ordinary skill in the art will recognize a variety of sync detector circuits that can be used in relation to different embodiments of the present invention.

The digital samples 314, 324 are also provided to a combined zero error phase detector 352 or phase start detector which calculates the estimated starting phases 353 of digital samples 314, 324. The combined zero error phase detector 352 can calculate the estimated starting phases 353 in any suitable manner, for example based on a sinusoidal pattern (e.g., 00110011) in the preamble field of the servo data. Based upon the disclosure provided herein, one of ordinary skill in the art will recognize a variety of zero error phase detector circuits that may be used in relation to different embodiments of the present invention. Notably, the phase start detection can be performed by detecting any particular phase in the digital samples 314, 324, and is not limited to detecting the zero error phase start.

The digital samples 314, 324 are also provided to a combined sync detector 350, which yields the positions or locations 351 of the syncmarks in digital samples 314, 324. The combined sync detector 350 and the sync detectors 342, 346 can be the same circuits in some embodiments.

The digital samples 314, 324 are also provided to a reader separation estimator 354, which calculates the integer phase offset M 356 and the fractional phase offset $\Delta T$ 355. The reader separation estimator 354 calculates the integer phase offset M 356 in some embodiments by calculating the difference between the locations 351 of the syncmarks in digital samples 314, 324. The reader separation estimator 354 calculates the fractional phase offset $\Delta T$ 355 in some embodiments by calculating the difference between the starting phases 353 yielded by the combined zero error phase detector 352. The combined zero error phase detector 352, the combined sync detector 350 and the reader separation estimator 354 are collectively referred to herein as a head separation estimation circuit.

The head separation estimation is performed in two dimensional magnetic recording system 300 according to some embodiments as follows:

Step 1: Perform phase start detection in combined zero error phase detector 352 based on digital samples 314, 324, and calculate fractional phase offset $\Delta T$ 355 in reader separation estimator 354 as the difference between phase start location of first and second streams in digital samples 314, 324.

Step 2: Calibrate loop pulse estimation LPE1 and LPE2 for the signal from each read head 304, 305 while reading known data as follows:
  d) Train first loop pulse estimation LPE1 341 using digital samples 314 for the signal from the primary read head 304, applying any desired loop pulse estimation constraints.
  e) Set the timing loop error combining ratio to [1 0] in timing loop 333 to consider only the signal from the primary read head 304 in the timing loop 333
  f) Interpolate the second loop pulse estimation LPE2 345 from the first loop pulse estimation LPE1 341 based on the fractional phase offset $\Delta T$ 355

Step 3: Calibrate integer phase offset M 356 as follows:
  d) Set timing loop error combining ratio to [1/2 1/2] in timing loop 333 to consider signals from the primary read head 304 and secondary read head 305 in the timing loop 333
  e) Detect the syncmarks 351 in the two streams in combined sync detector 350 with the stream processing controlled based on both loop pulse estimations LPE1 341 and LPE2 345
  f) Compute the integer phase offset M 356 as the difference between the locations of the syncmarks 351 in both streams By performing the calibration of the first loop pulse estimation LPE1 341, then interpolating from the first loop pulse estimation LPE1 341 to yield the second loop pulse estimation LPE2 345 based on the fractional phase offset $\Delta T$ 355, the loop pulse estimation for both signal paths can be completed without relying on previous phase alignment of the two signal paths. The syncmark detection can then be performed using the calibrated first loop pulse estimation LPE1 341 and second loop pulse estimation LPE2 345.

Figure 4:
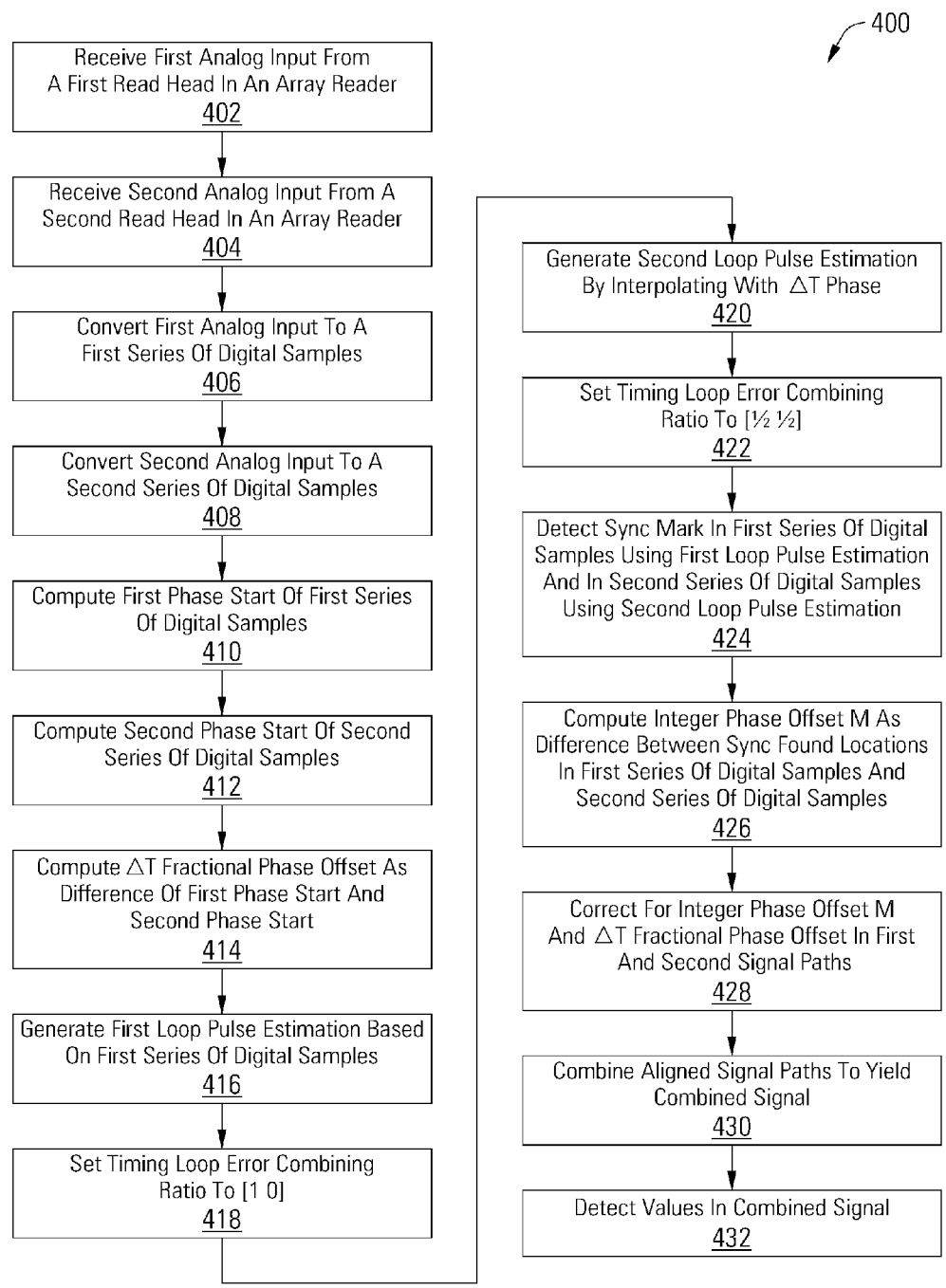
FIG. 4 is a flow diagram showing a method for estimating head separation in a two dimensional magnetic recording system in accordance with some embodiments of the present invention.

Turning to FIG. 4, a flow diagram 400 shows a method for estimating head separation in a two dimensional magnetic recording system in accordance with some embodiments of the present invention. Following flow diagram 400, a first analog input is receives from a first read head in an array reader (block 402). A second analog input is received from a second read head in an array reader (block 404). The first analog input is converted to a first series of digital samples (block 406). The second analog input is converted to a second series of digital samples (block 408). A first phase start of the first series of digital samples is computed (block 410). A second phase start of the second series of digital samples is computed (block 412). The phase starts of the two signals can be computed in any suitable manner, such as in a Zero Error Phase Start (ZPS) detector circuit which calculates estimated starting phases based on a sinusoidal pattern (e.g., 00110011) in the preamble field of servo data. The phase start detection can be performed by detecting any particular phase, and is not limited to detecting the zero error phase start.

The fractional phase offset $\Delta T$ is computed as the difference of the first phase start and the second phase start (block 414). The first loop pulse estimation is generated based on the first series of digital samples (block 416). The combining ratio of the timing loop error for the two signals is set to [1 0] (block 418). The second loop pulse estimation is generated by interpolating with the fractional phase offset ΔT (block 420). The timing loop error combining ratio is set to [1/2 1/2] (block 422). The syncmark is detected in the first series of digital samples using the first loop pulse estimation and is detected in the second series of digital samples using the second loop pulse estimation (block 424). The loop pulse estimations can be used to configure the system in any suitable manner, such as, but not limited to, in generating feedback signals to control filtering or gain in an analog front end, equalizer, analog to digital converter, etc. The integer phase offset M is computed as the difference between sync found locations in the first series of digital samples and in the second series of digital samples (block 426). The integer phase offset M and ΔT fractional phase offset are corrected in first and second signal paths (block 428). In some embodiments, the integer phase offset M is corrected using a delay in the earlier of the two signal paths, for example in a first-in first-out (FIFO) memory. In some embodiments, the ΔT fractional phase offset is corrected by adjusting a synthesizer in a timing loop to adjust the sampling phase of an analog to digital converter. The aligned signal paths are combined to yield a combined signal (block 430). Values in the combined signal are detected (block 432). In some embodiments, values are detected by applying a data detection algorithm such as, but not limited to, a Soft Output Viterbi Algorithm (SOVA) detection process. The steps of the method can be performed in any suitable manner, either serially or at least partly in parallel.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel head separation estimation in a two dimensional magnetic recording servo system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus comprising:
   an array reader comprising a plurality of read heads operable to read data from a magnetic storage medium;
   a first preamplifier connected to a first read head in the plurality of read heads;
   a second preamplifier connected to a second read head in the plurality of read heads; and
   a head separation estimation circuit connected to the first preamplifier and to the second preamplifier, operable to estimate an integer phase offset and a fractional phase offset between a first signal from the first read head and a second signal from the second read head.

2. The apparatus of claim 1, wherein the head separation estimation circuit comprises a phase start detector operable to determine a starting phase for the first signal and a starting phase for the second signal.

3. The apparatus of claim 2, wherein the head separation estimation circuit further comprises a reader separation estimator operable to calculate a fractional phase offset between the first signal and the second signal based on a difference between the starting phase for the first signal and the starting phase for the second signal.

4. The apparatus of claim 1, wherein the head separation estimation circuit further comprises a loop pulse estimation circuit operable to calculate a loop pulse estimation for the first signal.

5. The apparatus of claim 4, wherein the head separation estimation circuit further comprises a second loop pulse estimation circuit operable to calculate a loop pulse estimation for the second signal by interpolating from the loop pulse estimation for the first signal by a fractional phase offset between the first signal and the second signal.

6. The apparatus of claim 1, wherein the head separation estimation circuit comprises a sync detector operable to detect a syncmark in the first signal and in the second signal.

7. The apparatus of claim 6, wherein the head separation estimation circuit further comprises a reader separation estimator operable to calculate an integer phase offset between the first signal and the second signal based on a difference between a syncmark location in the first signal detected by the sync detector and a syncmark location in the second signal detected by the sync detector, wherein the integer phase offset comprises a phase offset between the first signal and a second signal that has an integer multiple of a bit period.

8. The apparatus of claim 1, further comprising a first-in first-out memory connected to the first signal and a second first-in first-out memory connected to the second signal, wherein the first-in first-out memories are operable to delay an output by an integer phase offset between the first signal and the second signal such that a phase offset between the output of the first-in first-out memory and the output of the second first-in first-out memory is less than a single bit period.

9. The apparatus of claim 1, further comprising a timing loop connected to the first signal and to the second signal, wherein the timing loop is operable to generate a feedback signal to reduce a fractional phase difference between the first signal and the second signal.

10. The apparatus of claim 9, wherein the timing loop comprises at least one multiplier to scale the first signal and the second signal before generating the feedback signal to reduce a fractional phase difference between the first signal and the second signal.

11. The apparatus of claim 1, further comprising an adder circuit to combine the first signal and the second signal after an integer phase delay and a fractional phase delay between the first signal and the second signal have been removed, yielding a combined signal.

12. The apparatus of claim 11, further comprising a data detector operable to detect values of samples in the combined signal.

13. A method for estimating head separation in a two dimensional magnetic recording system, comprising:

computing a phase start of a first signal from a first read head and a phase start of a second signal from a second read head;

calculating a fractional phase offset between the first signal and the second signal as a difference between the phase start of the first signal and the phase start of the second signal;

calibrating a first loop pulse estimate for the first signal;

interpolating the first loop pulse estimate by the fractional phase offset to yield a second loop pulse estimate for the second signal;

detecting a syncmark in the first signal and in the second signal; and calculating an integer phase offset between the first signal and the second signal as a difference between a location of the syncmark in the first signal and in the second signal.

14. The method of claim 13, further comprising setting a timing loop combining ratio to [1 0] for the first signal and the second signal before the interpolating.

15. The method of claim 13, further comprising setting a timing loop combining ratio to [1/2 1/2] for the first signal and the second signal before detecting the syncmark.

16. The method of claim 15, further comprising:

cancelling the fractional phase offset in a timing loop; and cancelling the integer phase offset in a first-in first-out memory.

17. The method of claim 16, further comprising:

combining the first signal and the second signal to yield a combined signal; and applying a data detection algorithm to the combined signal to yield detected values.

18. A storage device, comprising:

a magnetic storage medium operable to store data;

a head assembly disposed in relation to the storage medium and comprising an array reader with a plurality of read heads to read and write the data on the storage medium;

a first preamplifier connected to a first read head in the plurality of read heads;

a second preamplifier connected to a second read head in the plurality of read heads; and a head separation estimation circuit connected to the first preamplifier and to the second preamplifier, operable to estimate an integer phase offset and a fractional phase offset between a first signal from the first read head and a second signal from the second read head.

19. The storage device of claim 18, wherein the head separation estimation circuit is operable to calculate a fractional phase offset between the first signal and the second signal based on phase start detection of the first signal and the second signal, further comprising a loop pulse estimation circuit operable to calibrate a loop pulse estimation for the first signal and to interpolate the loop pulse estimation for the first signal by the fractional phase offset to yield a second loop pulse estimation for the second signal.

20. The storage device of claim 19, wherein the head separation estimation circuit is further operable to detect a syncmark in the first signal and in the second signal and to calculate an integer phase offset between the first signal and the second signal as a difference between a location of the syncmark in the first signal and a location of the syncmark in the second signal.

* * * * *